(12) United States Patent
Dai et al.

(10) Patent No.: US 8,044,631 B2
(45) Date of Patent: Oct. 25, 2011

(54) POWER CONVERSION SYSTEMS AND METHODS FOR CONTROLLING HARMONIC DISTORTION

(75) Inventors: Jingya Dai, Toronto (CA); Yongqiang Lang, Toronto (CA); Bin Wu, Toronto (CA); Dewei Xu, Pickering (CA); Navid R. Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 472 days.

(21) Appl. No.: 12/345,916

(22) Filed: Dec. 30, 2008

(65) Prior Publication Data

US 2010/0165674 A1 Jul. 1, 2010

(51) Int. Cl.
*H02P 27/04* (2006.01)

(52) U.S. Cl. ......... 318/800; 318/727; 318/801; 318/811

(58) Field of Classification Search .................. 318/727, 318/800, 801, 803, 809, 810, 811; 363/34, 363/37, 84, 89, 95, 96, 97
See application file for complete search history.

(56) References Cited

U.S. PATENT DOCUMENTS

| | | | |
|---|---|---|---|
| 5,309,349 A * | 5/1994 | Kwan | 363/98 |
| 5,355,297 A | 10/1994 | Kawabata et al. | |
| 5,361,196 A | 11/1994 | Tanamachi et al. | |
| 5,506,765 A | 4/1996 | Nakata et al. | |
| 5,552,977 A * | 9/1996 | Xu et al. | 363/41 |
| 5,627,742 A | 5/1997 | Nakata et al. | |
| 5,910,892 A | 6/1999 | Lyons et al. | |
| 6,166,929 A | 12/2000 | Ma et al. | |
| 6,191,966 B1 | 2/2001 | Yu | |
| 6,288,921 B1 | 9/2001 | Uchino et al. | |
| 6,333,569 B1 | 12/2001 | Kim | |
| 6,366,483 B1 | 4/2002 | Ma et al. | |
| 6,466,465 B1 | 10/2002 | Marwali | |
| 6,534,949 B2 | 3/2003 | Szczesny et al. | |
| 6,617,814 B1 | 9/2003 | Wu et al. | |
| 6,642,690 B2 * | 11/2003 | Kim | 318/811 |
| 7,075,267 B1 * | 7/2006 | Cheng | 318/807 |
| 7,898,210 B2 * | 3/2011 | Hsieh et al. | 318/811 |
| 2010/0072980 A1 | 3/2010 | Schmitt et al. | |

OTHER PUBLICATIONS

Qingrong Zeng and Liuchen Chang, "Improved Current Controller Based on SVPWM for Three-Phase Grid-Connected Voltage Source Inverter", 2005 IEEE.
European Search Report, EP09180852, Jan. 6, 2010.
DSP Based Space Vector PWM for Three-Level Inverter With DC-Link VoltageVoltage Balancing, Hyo L. Liu, Nam S. Choi and Gyu H. Cho, 1991 IEEE.
Switching Loss Minimized Space Vector PWM Method for IGBT Three-Level Inverter, B. Kaku, I. Miyashita, S. Sone, IEEE Proc.-Electr. Power Appl., vol. 144, No, 3, May 1997.

(Continued)

*Primary Examiner* — Walter Benson
*Assistant Examiner* — Thai Dinh
(74) *Attorney, Agent, or Firm* — Fay Sharpe LLP; Alexander R. Kuszewski; John M. Miller

(57) ABSTRACT

Control systems, methods and power conversion systems are presented for controlling harmonic distortion, in which multi-sampling space vector modulation (SVM) is employed for controlling power converter switching devices, with a reference vector being sampled two or more times during each SVM period to update the SVM dwell times more than once during each SVM cycle.

19 Claims, 8 Drawing Sheets

OTHER PUBLICATIONS

A Neutral-Point—Clamped PWM Inverter, Akira Nabae, Isao Takahashi, Hirofumi Akagi, IEEE Transactions on Industry Applications, vol. 1A-17, No. 5, Sep./Oct. 1981.

ACS 1000-World's First Standard AC Drive for Medium-voltage Applications, Sohail Malik, Dieter Kluge, ABB Review Feb. 1998.

New Variable Speed Drive with Proven Motor Friendly Performance for Medium Voltage Motors, Juergen K. Steinke and Risto Vuolle, Herbert Prenner, Jukka Jarvinen, 1999 IEEE.

New Feedforward Space-Vector PWM Method to Obtain Balanced AC Output Voltages in a Three-Level Neutral-Point-Clamped Converter, Josep Pou, Dushan Boroyevich, Rafael Pindado, IEE Transactions on Industrial Electronics, vol. 49, No. 5, Oct. 2002.

Effects of Nonsinusoidal Voltage on the Operation Performance of a Three-Phase Induction Motor, Ching-Yin Lee, Wei-Jen Lee, IEEE Transactions on Energy Conversion, vol. 14, No. 2, Jun. 1999.

IEE Recommended Practices and Requirements for Harmonic Control in Electrical Power Systems, published by the Institute of Electrical and Electronic Engineers, Inc., New York, NY, Apr. 12, 1993.

A Novel Space Vector Control of Three-Level PWM Converter, Lixiang Wei, Yuliang Wu, Chongjian Li, Huiqing Wang, Shixiang Liu Fahai Li, IEEE 1999 International Conference of Power Electronics and Drive Systems, PEDS'99, Jul. 1999, Hong Kong.

Comparison of RPWM and PWM Space Vector Switching Schemes for 3-Level Power Inverters, Y. Shrivastava, C.K. Lee, S.Y.R. Hui and H.S.H. Chung, Department of Electronic Engineering, City University of Hong Kong, with the University of Sydney, Australia, 2001 IEEE.

A Neutral-Network-Based Space-Vector PWM Controller for a Three-Level Voltage-Fed Inverter Induction Motor Drive, Subrata K. Mondal, Joao O. P. Pinto, Bimal K. Bose, IEEE Transactions on Industry Applications, vol. 38, No. 3, May/Jun. 2002.

Tadros, Y.: Salama, S.; Hof, R., "Three-level TGBT inverter", Power Electronics Specialists Conference, 1992 PESC '92 Record, 23$^{rd}$ Annual IEEE Jun. 29-Jul. 3, 1992, pp. 46-52 vol. 1.

Du Toit Mouton, II., "Natural Balancing of Three-Level Neutral-point Clamped PWM inverters", IEEE Transactions on, Industrial Electronics, V49, 15, pp. 1017-1025, 2002.

Alonso, O.; Marroyo, L.; Sanchis, P.; Gubia, E.; Guerrero, A., "Analysis of Neutral-Point Voltage Balancing Problem in Three-Level Neutral-Point Clamped Inverters with SVPWM Modulation", IEEE IEcon'02, V2, pp. 920-925, 2002.

Pou, J.; Boroyevich, D.; Pindado, R., "Effects of Imbalances and Nonlinear Loads on the Voltage Balance of a Neutra-Point-Clamped Inverter", Power Electronics, IEEE Transactions on vol. 20, Issue 1, Jan. 2005 pp. 123-131.

Celanovic, N.; Boroyevich, D., "A Comprehensive Study of Neutral-Point Voltage Balancing Problem in a Three-Level Neutral-Point Clamped Voltage Source PWM Inverters", IEEE Transactions on, Power Electronics, V15, 12, pp. 242-249, 2000.

Shinohara, K.; Sakasegawa, E., "A New PWM Method with Suppressed Neutral Point Potential Variation of Three Level Inverter for AC Servo Motor Drive", Power Electronics and Drive Systems, 1999. PEDS "99. Proceedings of the IEEE 1999 International Conference on vol. 2, Jul. 27-29, 1999 pp. 668-672 vol. 2.

Tae Hyeong Seo Chang Ho Choi, Compensation for the Neutral-Point Potential Variation in Three-Level Space Vector PWM, APAE 2001, vol. 2, on pp. 1135-1140 vol. 2.

Holtz, J.; Springob, L. "Reduce Harmonics PWM Controlled Line-Side Converter for Electric Drives", Industry Applications, IEEE Transactions on vol. 29, Issue 4, Jul.-Aug. 1993 pp. 814-819.

Liu, H.L.; Cho, G.H., "Three-Level Space vector PWM in Low Index Modulation Region Avoiding Narrow Pulse Problem", Power Electronics, IEEE Transactions on vol. 9, Issue 5, Sep. 1994 pp. 481-486.

Seixas, P.F.; Severo Mendes, M.A.; Donoso-Garcia, P.; Lima, A.M. N., "A Space Vector PWM Method for Three-Level Voltage Source Inverters", Applied Power Electronics Conference and Exposition, 2000. APEC 2000. Fifteenth Annual IEEE vol. 1, Feb. 6-10, 2000 pp. 549-555 vol. 1.

Fei Wang, "Sin-Triangle Versus Space-Vector Modulation for Three-Level PWM Voltage-Source Inverters", Industry Applications, IEEE Transactions on vol. 38, Issue 2, Mar.-Apr. 2002 pp. 500-506.

Quiang Song; Wenhua Liu; Qingguang Yu; Xiaorong Xie; Zhonghong Wang, "A Neutral-Point Potential Balancing Algorithm for Three-Level NPC Inverters Using Analytically Injected Zero-Sequence Voltage", Applied Power Electronics Conference and Exposition, 2003. APEC "03. Eighteenth Annual IEEE vol. 1, Feb. 9-13, 2003 pp. 228-233 vol. 1.

Koyama, M.; Fujii, t.; Uchida, R.; Kawabata, T., "Space Voltage Vector-Based New PWM Method for Large Capacity Three-Level GTO Inverter", Industrial Electronics, Control, Instrumentation, and Automation, 1992. "Power Electronics and Motion Control"., Proceedings of the 1992 International Conference on Nov. 9-13, 1992 pp. 271-276 vol. 1.

Tamai, S..; Koyama, M.; Fujii, T,; Mizoguchi, S.; Kawabata, t., "3 Level GTO Converter-Inverter Pair System for Large Capacity Induction Motor Drive", Power Electronics and Applications, 1993., Fifth European Conference on Sep. 13-16, 1993 pp. 45-50 vol. 5.

Lyons, J.P.; Vlalkovic, V.; Espelage, P.M.; Boeltner, F.H.; Larsen, E., "Innovation IGCT main drives", Industry Applications Conference, 1999. Thirty Fourth IAS Annual Meeting. Conference Record of the 1999 IEEEE vol. 4, Oct. 3-7, 1999 pp. 2655-2661 vol. 4.

Yo-Han Lee; Bum-Scok Suh; Chang-Ho Choi: Dong-Seok Hyun, "A New Neutral Point Current Control for a 3-Level Converter/Inverter Pair System", Industry Applications Conference, 1999. Thirty-Fourth IAS Annual Meeting. Conference Record of the 1999 IEEE vol. 3, Oct. 3-7, 1999 pp. 1528-1534 vol. 3.

Dongsheng Zhou; Rouaud, D.G., "Experimental Comparisons of Space Vector Neutral Point Balancing Strategies for Three-Level Topology", Power Electronis, IEEE Transactions o vol. 16, Issue 6, Nov. 2001 pp. 872-879.

Rodriguez, J.; Pontt, J.; Alzamora, G.; Becker, N.;Einenkel, O.; Weinstein, A.,"Novel 20-MW Downhill Conveyor System Using Three-Level converters", Industrial Electronis, IEEE Transactions on vol. 49, Issue 5, Oct. 2002 pp. 1093-1100.

Ogasawara, S.; Akagi, H., "Analysis of Variation of Neutral Point Potential in Neutral-Point Clamped Voltage Source PWM Inverters", Industry Applications Society Annual Meeting, 1993, Conference Record of the 1993 IEEE Oct. 2-8, 1993 pp. 965-970 vol. 2.

Navid R. Zargari, Steven C. Rizzo, Yuan Xiao, Hideo Iwamoto, Katsumi Satoh, and John F. Donlon, "A New Current-Source Converter Using a Symmetric Gate-Commutated Thyristor (SGCT)", 2001 IEEE.

Yoshitaka Iwaki, Takashi Sukegawa, Toshiaki Okuyama, Takashi Ikimi, Masakane Shigyo, and Masahiro Tobise, "A New PWM Method to Reduce Beat Phenomenon in Large-Capacity Inverters with Low Switching Frequency", IEEE Transactions on Industry Applications, vol. 35, No. 3, May/Jun. 1999.

Yun Wei Li, Bin Wu, Navid R. Zargari, Jason C. Wiseman, David Zu, "Damping of PWM Current Rectifier Using a Hybrid Combination Approach", IEEE Transactions on Power Electronics, vol. 22, No, 4, Jul. 2007.

Albert Ming Qui, Yun Wei Li, Bin Wu, Dewei Xu, Navid Zargari, and Yanfei Liu, "High Performance Current Source Inverter Fed Induction Motor Drive with Minimal Harmonic Distortion", Dept. Electrical & Computer Engineering Queen's University, Kingston ON, 2007 IEEE.

Hamid R. Karshenas, Hassan Ali Lojori, Shashi B. Dewan, "Generalized Techniques of Selective Harmonic Elimination and Current Control in Current Source Inverters/Converters", IEEE Transactions on Power Electronics, vol, 10, No. 5, Sep. 1995.

Yuan Xiao, Bin Wu, Steven C. Rizzo, and Reza Sotudeh, "A Novel Power Factor Control Scheme for High-Power GTO Current-Source Converter", IEEE Transactions on Industry Applications, vol. 34, No. 6, Nov./Dec. 1998.

Jose R. Espinoza, Geza Joos, Johan I. Guzman, Luis A. Moran, and Rolando P. Burgos, "Selective Harmonic Elimination and Current/Voltage Control in Current/Voltage-Source Topologies: A Unified Approach", IEEE Transactions on Industrial Electronics, vol. 48, No. 1, Feb. 2001.

Bin Wu, Shashi B. Dewan, and Gordon R. Slemon, "PWM-CSI Inverter for Induction Motor Drives", IEEE Transactions on Industry Applications, vol. 28, No. 1, Jan./Feb. 1992.

Jose R. Espinoza, Geza Joos, Luis A. Cea, and Lautaro D. Salazar, "Space Vector Modulation Techniques for Current Source Rectifiers Operating at Switching Frequencies up to 1 kHz", 1998 IEEE.

Jack Daming Ma, Bin Wu, Navid R. Zargari, and Steven C. Rizzo, "A Space Vector Modulated CSI-Based AC Drive for Multimotor Applications", IEEE Transactions on Power Electronics, vol. 16, No. 4, Jul. 2001.

Yun Wei Li, Bin Wu, David Xu, and Navid R. Zargari, "Space Vector Sequence Investigation and Synchronization Methods for Active Front-End Rectifiers in High-Power Current-Source Drives", IEEE Transactions on Industrial Electronics, vol. 55, No. 3, Mar. 2008.

D. N. Zmood, and D.G. Holmes, "A Generalised Approach to the Modulation of Current Source Inverters", 1998 IEEE.

M.F. Naguib, Luiz A.C. Lopes, "Harmonics Reduction in Low Switching Frequency Space Vector Modulated Current Source Converters", Electrical and Computer Engineering Department Concordia University, Montreal, Canada, 2008 IEEE.

Jingya Dai, Yongqiang Lang, Bin Wu, Dewei Xu, and Navid Zargari, "A Multi-Sampling SVM Scheme for Current Source Converter with Superior Harmonic Permance", Dept. of Electrical and Computer Engineering, 2009.

Akira Nabae, Isao Takahashi, and Hirofumi Akagi, "A New Neutral-Point-Clamped PWM Inverter", IEEE Transactions on Industry Applications, vol, 1A-17, No, 5, Sep./Oct., 1981 IEEE.

J. Shen and N. Butterworth, "Analaysis and design of a three-level PWM converter system for railway-traction applications", IEE Proc.-Electr. Power Appl., vol. 144, No. 5, Sep. 1997.

Josep Pou, Rafael Pindado, Dushan Boroyevich, and Pedro Rodriquez, "Limits of the Neutral-Point Balance in Back-to-Back-Connected Three-Level Converters", 2004 IEEE.

D.W.Kang, C.S. Ma, T.J. Kim, and D.S. Hyun, "Simple control strategy for balancing the DC-link voltage of neutral-point-clamped inverter at low modulation index", IEE Proc.-Electr. Power Appl., vol. 151, No. 5, Sep. 2004.

Shengming Li Nd Longya Xu, "Fault-tolerant operation of a 150kw 3-level neutral-point-clamped PWM Inverter in a flywheel energy storage system", The Ohio State University, 2001 IEEE.

Mario Marchesoni, Paolo Segarich, and Ernesto Soressi, "A new control strategy for neutral-point-clamped active rectifiers", IEEE Transactions on Industrial Electronics, vol. 52, No. 2, Apr. 2005.

Satoshi Ogasawara and Hirofumi Akagi, "A vector control system using a neutral-point-clamped voltage source PWM inverter", Nagaoka University of Technology, 1991 IEEE.

Roberto Rojas, Tokuo Ohynishi, and Takayuki Susuki, "Neutral-point-clamped inverter with improved voltage waveform and control range" The University of Tokushima, 1993 IEEE.

Jason C. Wiseman and Bin Wu, "Active damping control of a high-power PWM current-source rectifier for line-current THD reduction", 2005 IEEE.

Ching-Yin Lee and Wei-Jen Lee, "Effects of Nonsinusoidal Voltage on Operation Performance of a Three-phase Induction Motor", 1997 IEEE.

* cited by examiner

POWER CONVERSION SYSTEMS AND METHODS FOR CONTROLLING HARMONIC DISTORTION

FIELD OF THE INVENTION

The present disclosure relates generally to electrical power conversion and more particularly to controlling harmonic distortion in motor drives and other power converters.

BACKGROUND OF THE INVENTION

Power conversion systems convert electrical power from one form to another and may be employed in a variety of applications such as motor drives for powering an electric motor using power from an input source. Such power converters have been extensively employed in medium voltage motor drives and other applications in which electrical power needs to be converted from DC to AC or vice versa. Typically, the power converter is constructed using electrical switches actuated in a controlled fashion to selectively convert input power to output power of a desired form such as single or multi-phase AC of a controlled amplitude, frequency and phase to drive an AC motor according to a desired speed and/or torque profile, often in the presence of varying load conditions. Such conversion apparatus is commonly constructed as an inverter for converting DC to AC and/or a rectifier if the conversion is from AC to DC power, where the input and/or output AC power connections are often a multi-phase. Multi-phase converters are often constructed using an array of high-voltage, high-speed semiconductor-based switching devices which are selectively actuated through pulse width modulation (PWM) to couple the AC connections with one or the other of the DC bus terminals, with the timing of the array switching determining the power conversion performance. In motor drive applications, for example, the timed control of inverter switch activations is used to provide variable frequency, variable amplitude multi-phase AC output power from a DC bus to control a driven motor across wide voltage and speed ranges to control the motor speed and/or torque in the presence of varying load conditions.

Current source converters (CSC) are widely used in high power medium voltage (e.g., 2.3-13.8 kV) applications, which generally use a device switching frequency of several hundred hertz or less to mitigate device switching loss and maintain rated device thermal operating conditions. For these converters, several different modulation schemes can be employed, including selective harmonic elimination (SHE), trapezoidal pulse-width modulation (TPWM), and space vector modulation (SVM). Among these, SHE is effective for reducing low order harmonic distortion at low switching frequency. However, the modulation index of SHE is usually fixed due to implementation difficulties, and thus the SHE modulation approach typically does not allow control flexibility. Conventional SVM and TPWM modulation techniques allow modulation index adjustment, but generally suffer from high levels of low order harmonic distortion, particularly the $5^{th}$ and $7^{th}$ harmonics that are often close to the resonance frequency of motor drive AC filters. Accordingly, there is a need for improved power conversion systems and switching device modulation techniques by which low order harmonic distortion can be controlled while allowing modulation index control in conversion of electrical power for motor drives or other power conversion systems.

SUMMARY OF INVENTION

Various aspects of the present disclosure are now summarized to provide a basic understanding of the disclosure, where the following is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. Multi-sampling SVM (MS-SVM) techniques are presented for operating switching devices of a power converter in which computed SVM dwell time values are updated more than once in a given SVM cycle, by which low order harmonic distortion may be controlled in the conversion of electrical power, and implementations are presented in which various techniques are used to reduce additional switchings. The disclosure may be advantageously employed in motor drives or other power conversion systems to achieve superior low order harmonic distortion control comparable to that of SHE techniques while allowing modulation index control and other control flexibility of conventional SVM.

In accordance with one or more aspects of the present disclosure, power conversion systems and switching control systems therefor are provided. The power converter includes a multi-phase AC connection having two or more AC terminals for receiving or supplying multi-phase electrical power, as well as a DC circuit that receives or supplies DC electrical power. The conversion system further comprises a switching network, such as an inverter or rectifier having a plurality of switching devices coupled between the DC and AC terminals, as well as a switch control system providing control signals to the switches by space vector modulation. The SVM switch control signals are created according to dwell time values derived from a modulation index and an angle associated with a current reference vector representing a desired converted AC in a current space vector diagram sector to provide three switching states corresponding to vectors defining the current diagram sector in each of a continuous series of space vector modulation periods. The switch control system includes a multi-sampling SVM (MS-SVM) component which samples the reference vector and updates the dwell time values two or more times during each SVM period. The system may be a current source converter (CSC) or voltage source converter (VSC) type, and may be a motor drive that operates to drive an AC motor load. Moreover, the system may include both a rectifier and an inverter, either or both of which may be operated using the MS-SVM techniques. In order to combat certain excess switchings, the switch control system in certain embodiments may maintain the control signals according to an SVM zero vector once the zero vector has been selected until the end of a given SVM period.

In accordance with further aspects of the disclosure, a method is provided for SVM switching control of a switching power converter. The method includes providing switching control signals by space vector modulation to a plurality of switching devices of a switching network according to a plurality of dwell time values in each of a continuous series of space vector modulation periods. The method also includes sampling a current reference vector a plurality of times during each modulation period, and for each sampling of the current reference vector, deriving the dwell time values according to a modulation index and an angle associated with the current reference vector representing a desired converted AC in a current space vector diagram sector to selectively provide three switching states in the switching network corresponding to three diagram vectors defining the current diagram sector.

Further aspects of the disclosure provide a computer readable medium with computer-executable instructions for providing switching control signals by space vector modulation to a plurality of switching devices of a switching network according to a plurality of dwell time values in each of a continuous series of space vector modulation periods to convert power from DC to AC or AC to DC using the switching network. The computer readable medium also includes computer-executable instructions for sampling a current reference vector a plurality of times during each modulation period, and for each sampling of the current reference vector, deriving the dwell time values according to a modulation index and an angle associated with the current reference vector representing a desired converted AC in a current space vector diagram sector to selectively provide three switching states in the switching network corresponding to three diagram vectors defining the current diagram sector.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF THE INVENTION

Figure 1A:
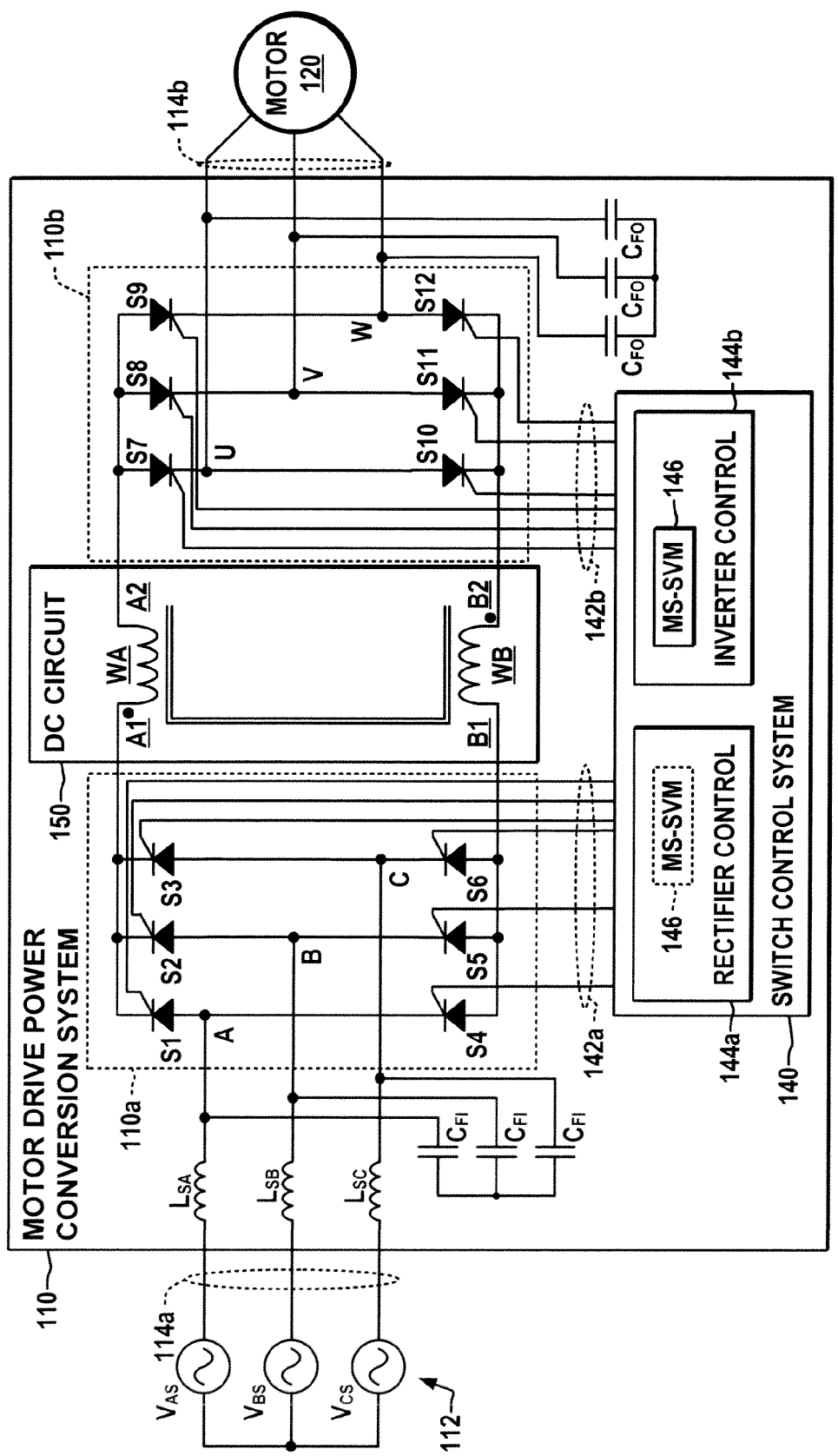
FIG. 1A is a schematic diagram illustrating an exemplary CSC-type motor drive power conversion system driving an induction motor using power from a three-phase AC power source via a switching type AC-DC-AC power conversion system operated by a motor control system using multi-sampling space vector modulation (MS-SVM) in accordance with one or more aspects of the present disclosure.

Referring now to the figures, several embodiments or implementations of the present disclosure are hereinafter described in conjunction with the drawings, wherein like reference numerals are used to refer to like elements throughout, and wherein the various features are not necessarily drawn to scale. The disclosure provides information capture systems and methods for operating an electric motor drive in which motor drive information is captured and stored in non-volatile memory for use in analyzing the drive and plant conditions leading up to a triggering event, such as a system fault, shutdown, device failure, etc. The disclosure finds utility in association with any form of power conversion system, and is illustrated and described hereinafter in the context of an exemplary switching type AC-DC-AC motor drive conversion system 110 powering a polyphase induction motor 120, although the disclosure is not limited to the illustrated embodiments. In this regard, while the exemplary power converter 110 is a current source converter (CSC) type system, the disclosure may also be implemented in association with voltage source converters (VSCs). Moreover, the MS-SVM aspects of the present disclosure may be implemented in the illustrated systems in one or both of the rectifier 110a and/or the inverter 110b, wherein all such variant embodiments are contemplated as falling within the scope of the present disclosure and the claims.

FIG. 1 illustrates a system including an AC power source 112 providing multiphase AC electric power to a motor drive type power conversion system 110 in accordance with one or more aspects of the present disclosure. The exemplary motor drive 110 in one embodiment is a current source converter with line side and machine (load) side switching converters 110a and 110b, respectively, operated by a switch control system 140 for motor drive operation by control of a switching rectifier 110a and a switching inverter 110b coupled by a DC circuit 150 to selectively provide three-phase electric power to the motor load 120. In the illustrated example, a three-phase AC power source 112 provides electrical power to the motor drive 110 via a three-phase input 114a. The present disclosure may be advantageously employed in association with single-phase implementations, as well as multi-phase systems having three or more power lines. The source 112, moreover, may be operated at any suitable source frequency with the motor drive 110 being adapted to receive and convert the input AC power at the supply frequency, wherein the disclosure is not limited to the three-phase embodiment of FIG. 1.

In this example, the AC input power is switched by a first set of switches S1-S6 constituting a line side converter 110a in the form of a switching regulator circuit or stage to create an intermediate DC bus current and a machine side converter 110b comprises a second set of switches S7-S12 forming a CSI switching inverter stage that selectively switches the DC power to provide AC power to a motor load output 114b for providing drive current to the leads of the motor 120, with an intermediate DC circuit 150 including a DC link choke or inductor linking the first and second sets of switches and providing forward and reverse current paths between the rectifier 110a and the inverter 110b. The inductor of the intermediate circuit 150 includes a first winding WA in a forward or positive DC path having a first end A1 connected to the upper rectifier switches S1-S3 and a second end A2 coupled with the upper output switches S7-S9 of the inverter 110b, along with a second winding WB in a negative or return DC path with a first end B1 coupled to the lower rectifier switches S4-S6 and a second end B2 coupled to the lower output switches S10-S12 of the inverter 110b. The exemplary motor drive 110, moreover, includes optional line reactors $L_{SA}$, $L_{SB}$, and $L_{SC}$ connected in series between the input phase sources $V_{AS}$, $V_{BS}$, and $V_{CS}$ (112) and corresponding switch circuit input nodes A, B, and C, respectively, of the rectifier 110a, as well as optional input line filter capacitors $C_{FI}$ wye-coupled to the input nodes A, B, and C. In addition, the exemplary drive 110 may also optionally include output filter capacitors $C_{FO}$ connected along the output lines U, V, and W.

The switching devices S1-S6 and S7-S12 may be any suitable controllable electrical switch types (e.g., thyristors, IGBTs, etc.) that are controlled according to any suitable type or form of switching scheme or schemes, such as phase control, pulse width modulation, etc., in open or closed-loop fashion. In the drive 110, moreover, rectifier and inverter switching control signals 142a and 142b are provided to the individual switches S1-S6 and S7-S12 from rectifier and inverter control components 144a and 144b, respectively, of the switch control system 140 in order to implement a given power conversion task, where the controller 140 may be provided with one or more setpoint desired values and one or more feedback signals or values by which the output power is controlled, where such inputs (not shown) may be in any suitable form such as an electrical signal, digital data, etc., and which may be received from any suitable source, such as an external network, switches, a user interface provided on the drive 110, or other suitable source(s).

The switch control system 140 and the components 144, 146 thereof can be implemented as any suitable hardware, software, programmable logic, or combinations thereof, operative as any suitable controller or regulator by which the motor 120 is controlled according to one or more desired profile(s) or setpoint(s) in open or closed-loop fashion. In this regard, the exemplary controller can be operated in a number of different modes or control schemes, including controlling torque, speed, position, etc., although the particular motor control scheme or application is not a strict requirement of the present disclosure. The switch control system 140 is operative to provide appropriate switching signals 142 to operate the motor 120 in accordance with a given control strategy, wherein the switch controls 142 provide pulse width modulation (PWM) switch timing control. In operation, three-phase AC power from the input power source 112 is provided to the rectifier 110a and the rectifier control component 144a of the switch controller 140 generates the appropriate rectifier control signals to selectively activate the first set of switches S1-S6 in order to generate DC power on a DC bus in the DC circuit 150. DC power from the intermediate circuit 150 is then converted to AC output power via the inverter 110b connected to the second winding ends A2 and B2 in which the switches S7-S12 receive inverter switching control signals 142b from the inverter component 144b of the controller 140 in order to provide AC power of appropriate amplitude, frequency, and phase to the motor 120 in a controlled fashion.

In general, the converter 110 can operate to convert input power from the source 112 to power the motor load 120, or may be operated to convert power from the motor 120 (e.g., operated as a generator) to provide power to the a power grid 112, where the switching converters 110a and 110b may be operated in a variety of modes. The converter 110 thus includes at least one multi-phase AC connection 114 operative to receive or supply multi-phase electrical power with the DC circuit 150 receiving or supplying DC electrical power. Each of the switching networks 110a, 110b includes a plurality of switching devices S1-S6, S7-S12 individually coupled between one of the current paths of the DC circuit 150 and one of the AC terminals of the AC connections 114a, 114b, and the switches selectively electrically couple the corresponding DC current path with the corresponding AC terminal according to a corresponding switching control signal 142.

In accordance with various aspects of the present disclosure, the switch control system 140 provides the switching control signals 142 to one or both of the stages 110a and 110b by space vector modulation according to a plurality of dwell time values $T_0$–$T_2$ derived from a modulation index $m_a$ and an angle $\theta_{ref}$ associated with a current reference vector $I_{ref}$ representing a desired converted AC in a current space vector diagram sector. The SVM control, moreover, employs multiple sampling of the reference vector $I_{ref}$ in order to update the dwell time values $T_0$–$T_2$ more than once per SVM period $T_S$, referred to herein as multi-sampling SVM or MS-SVM. The inventors have appreciated that this technique may be advantageously employed to combat low order harmonic distortion, particularly the $5^{th}$ and $7^{th}$ harmonics in order to provide the control flexibility of space vector modulation (including the capability of modulation index control) as well as the reduced low order harmonic advantages normally associated with selective harmonic elimination (SHE) type control. In this regard, the following description is provided with respect to MS-SVM control of the inverter 110b using an MS-SVM component 146 in the inverter control component 146 of the switch control system 140. Similar MS-SVM control of the rectifier 110a may be implemented through an MS-SVM component 146 in the rectifier control component 144a thereof, alone or in combination with MS-SVM control of the inverter 110b in accordance with the various aspects of the present disclosure.

As illustrated and described further below, the MS-SVM component 146 of the inverter control 144b operates to selectively provide three switching states in the switching network 110 corresponding to three diagram vectors (e.g., vectors $I_0$-$I_2$ in FIGS. 2A and 2B below) that define the current diagram sector (e.g., Sector 1 in FIG. 2A) in each of a continuous series of space vector modulation periods $T_s$ to convert power from the DC circuit 150 to provide output AC power to the motor 120 using the inverter switching network 110b, where the MS-SVM component 146 samples the current reference vector $I_{ref}$ and derives the dwell time values $T_0$–$T_2$ a plurality of times during each modulation period $T_s$. In this manner, the SVM vector selection is performed according to the most current dwell time values $T_0$–$T_2$. In addition, while the exemplary embodiments shown and described herein provide for use of a vector switching pattern in which two non-zero vectors are selected according to computed dwell times $T_1$ and $T_2$, followed by the zero vector $I_0$ at the end of the SVM period $T_S$, the various aspects of the present disclosure may be employed in association with any vector selection pattern.

In the exemplary inverter circuit 110b implementation, the switching devices S7-S12 are individually operable to selectively electrically couple the corresponding DC current path with the corresponding AC terminal of the output connection 114b according to a corresponding inverter switching control signal 142b to convert DC power to AC power at an AC output connection 114b. The switch control system 140 provides the inverter switching control signals 142b by space vector modulation according to inverter dwell time values $T_0$-$T_2$ derived from a modulation index $m_a$ and angle $\theta_{ref}$ associated with an inverter current reference vector $I_{ref}$ (e.g., FIGS. 2A and 2B) representing a desired converted AC at the AC output connection 114b in each of a continuous series of inverter space vector modulation periods $T_s$. The MS-SVM component 146 is operative to sample the inverter current reference vector $I_{ref}$ and to derive the inverter dwell time values $T_0$-$T_2$ a plurality of times during each inverter space vector modulation period $T_s$. In the illustrated motor drive converter 110, moreover, the rectifier switching network 110a including switching devices S1-S6 is operated by the rectifier control 144a to convert input AC power to DC power in the DC circuit 150, and the rectifier control component 144a provides the rectifier switching control signals 142a using a MS-SVM component 146 that samples a rectifier reference vector and derives rectifier dwell time values a plurality of times during each modulation rectifier space vector modulation period.

Figure 2A:
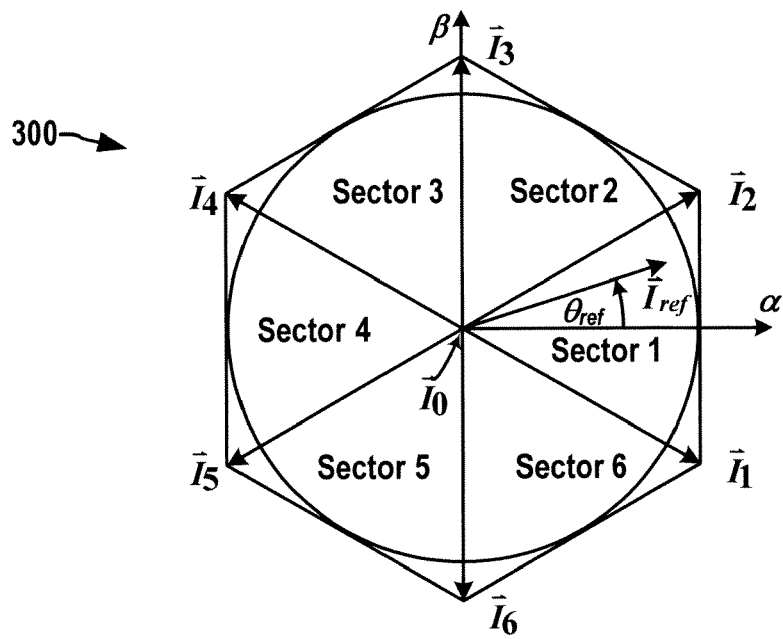
FIG. 2A is a schematic diagram illustrating an exemplary space vector diagram with a sampled reference current vector in one of six diagram sectors individually defined by a zero vector at the diagram origin and two non-zero vectors.
Figure 2B:
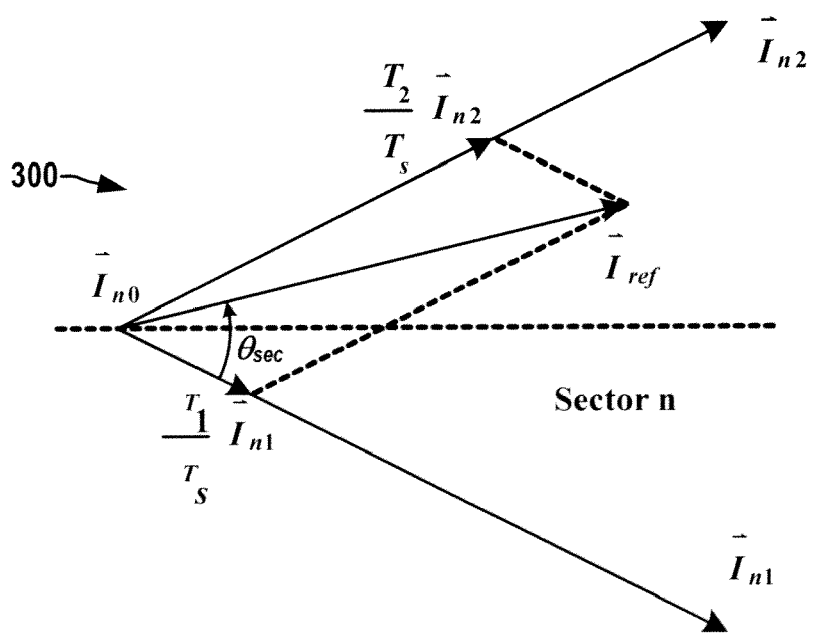
FIG. 2B is a simplified schematic diagram further illustrating vector synthesis for the exemplary reference vector in FIG. 2A in one exemplary implementation of the MS-SVM in accordance with the disclosure.

Referring now to FIGS. 1A, 2A, and 2B, the inverter switching scheme provides for two of the switching devices S7-S12 to be conducting (ON) at any given time, one of which being connected to the positive dc bus, and the other to the negative bus, thereby defining a total of 9 switching states including 6 active switching states and three zero states. These switching states can be represented by the vectors $I_0$-$I_6$ shown in an exemplary space vector diagram 300 shown in FIG. 2A. In this diagram 300, the space vector plane is divided into six sectors (Sector 1-Sector 6 in FIG. 2A) defined by the six active vectors $I_1$-$I_6$, while all the three zero vectors are at the diagram origin or center, shown as $I_0$. Three-phase reference currents can be expressed as a rotating reference vector $I_{ref}$ in the plane of the diagram 300, and can be synthesized by the vectors that bound the sector of the reference vector $I_{ref}$ based on the ampere-second balance. For example, if the reference vector $I_{ref}$ is located in a sector "n", the reference vector can be synthesized by vectors $\vec{I}_{n1}$, $\vec{I}_{n2}$ and $\vec{I}_{n0}$ that define the sector (e.g. vectors $I_0$, $I_1$, and $I_2$ define Sector 1 for the illustrated reference vector position in FIGS. 2A and 2B). Here the angle $\theta_{sec}$ is the angle displacement within the sector and hence is limited to the range of $[0,\pi/3)$. The vector synthesis can be performed by the following equations (1):

$$\begin{cases} \vec{I}_{ref} T_s = \vec{I}_1 T_1 + \vec{I}_2 T_2 + \vec{I}_0 T_0 \\ T_s = T_1 + T_2 + T_0. \end{cases} \quad (1)$$

The reference vector $I_{ref}$ is described by an angle $\theta_{sec}$ and a modulation index $m_a$ representing the vector magnitude, and from these, the SVM dwell times $T_0$-$T_2$ can be derived according to the following equations (2):

$$\begin{cases} T_1 = m_a \sin(\pi/3 - \theta_{sec}) T_s \\ T_2 = m_a \sin(\theta_{sec}) T_s \\ T_0 = T_s - T_1 - T_2. \end{cases} \quad (2)$$

Figure 3:
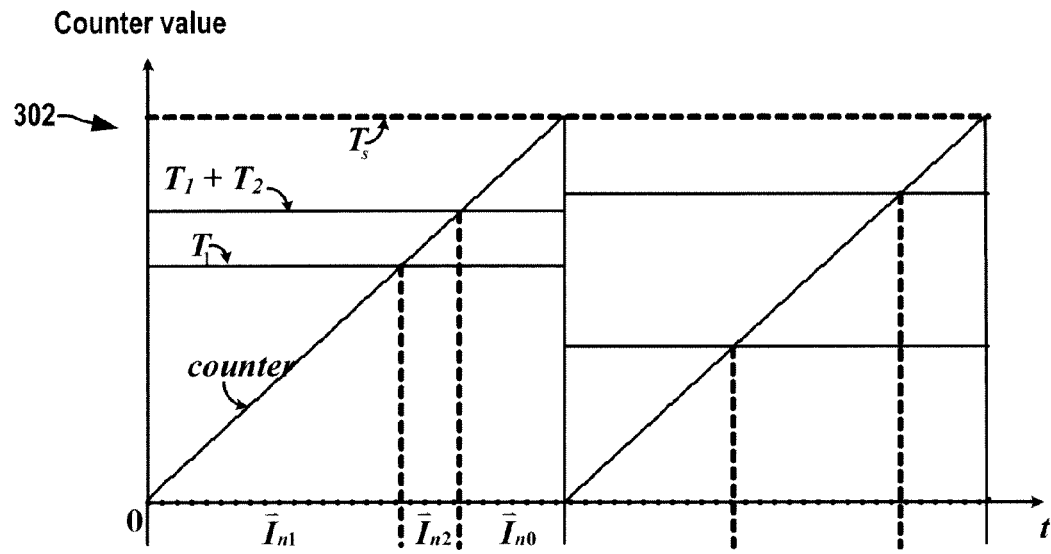
FIG. 3 is a graph showing conventional space vector modulation vector selection according to predetermined static dwell times.
Figure 4:
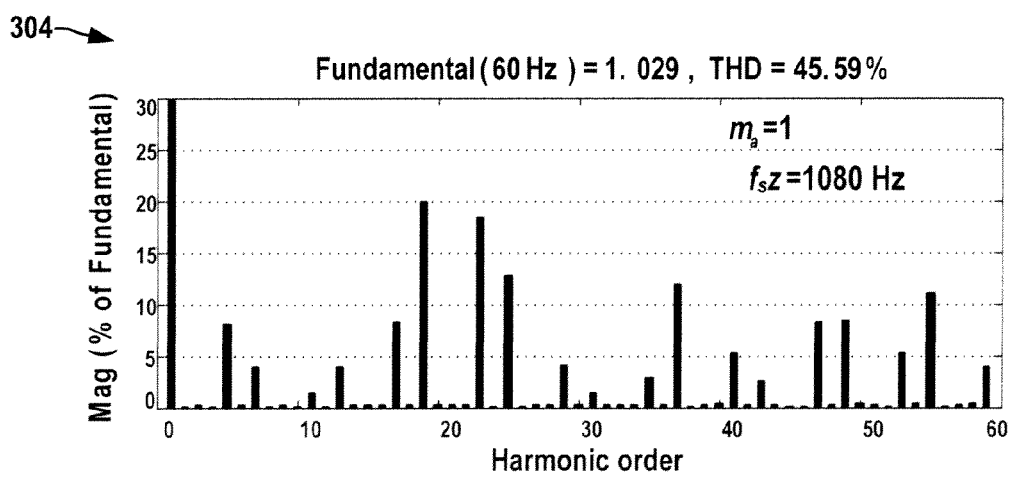
FIG. 4 is an exemplary harmonic profile showing significant $5^{th}$ and $7^{th}$ order harmonic distortion in the conventional SVM of FIG. 3.

Referring also to FIGS. 3 and 4, in the exemplary conversion system 110 of FIG. 1A, the switching sequence or pattern is a three segment method ($\vec{I}_{n1} \rightarrow \vec{I}_{n2} \rightarrow \vec{I}_{n0}$), in which the transition from one vector to another advantageously involves only one device switch-on and one device switch-off. The sampling frequency is $f_s=1/T_s$ and the resulting device switching frequency is $f_{sw}=f_s/2$. In one implementation, a counter repeatedly counts from 0 to $T_S$ for each SVM period. As shown in the conventional SVM pattern 302 of FIG. 3, the calculated value of $T_1$ and $T_1+T_2$ are compared with the SVM counter value for proper vector selection. In this regard, conventional SVM involves computing the dwelling time values $T_1$ and $T_2$ once per SVM period $T_S$. In this case, the first (non-zero) vector $\vec{I}_{n1}$ is selected at the beginning of the SVM period $T_S$, and once the counter value reaches $T_1$, the second (non-zero) vector $\vec{I}_{n2}$ is selected, and the zero vector $\vec{I}_{n0}$ is then selected if the counter reaches $T_1+T_2$. FIG. 4 provides a graph 304 showing the harmonic content of this conventional SVM switching approach, in which the $5^{th}$ and $7^{th}$ order harmonics are about 8% and 4% of the fundamental component, respectively. This harmonics profile is undesirable in power conversion systems generally, and in the case of the converter 110 of FIG. 1A, the high levels of $5^{th}$ and $7^{th}$ order harmonics of conventional SVM techniques in FIG. 3 is unacceptable as the AC filter capacitors $C_{FO}$ at the output 114b cannot effectively filter the lower order $5^{th}$ and $7^{th}$ harmonics shown in the graph 304 of FIG. 3. As a result, power conversion systems have been unable to utilize the flexible control aspects of SVM switching techniques, and instead SHE has been the dominant modulation method.

Figure 1B:
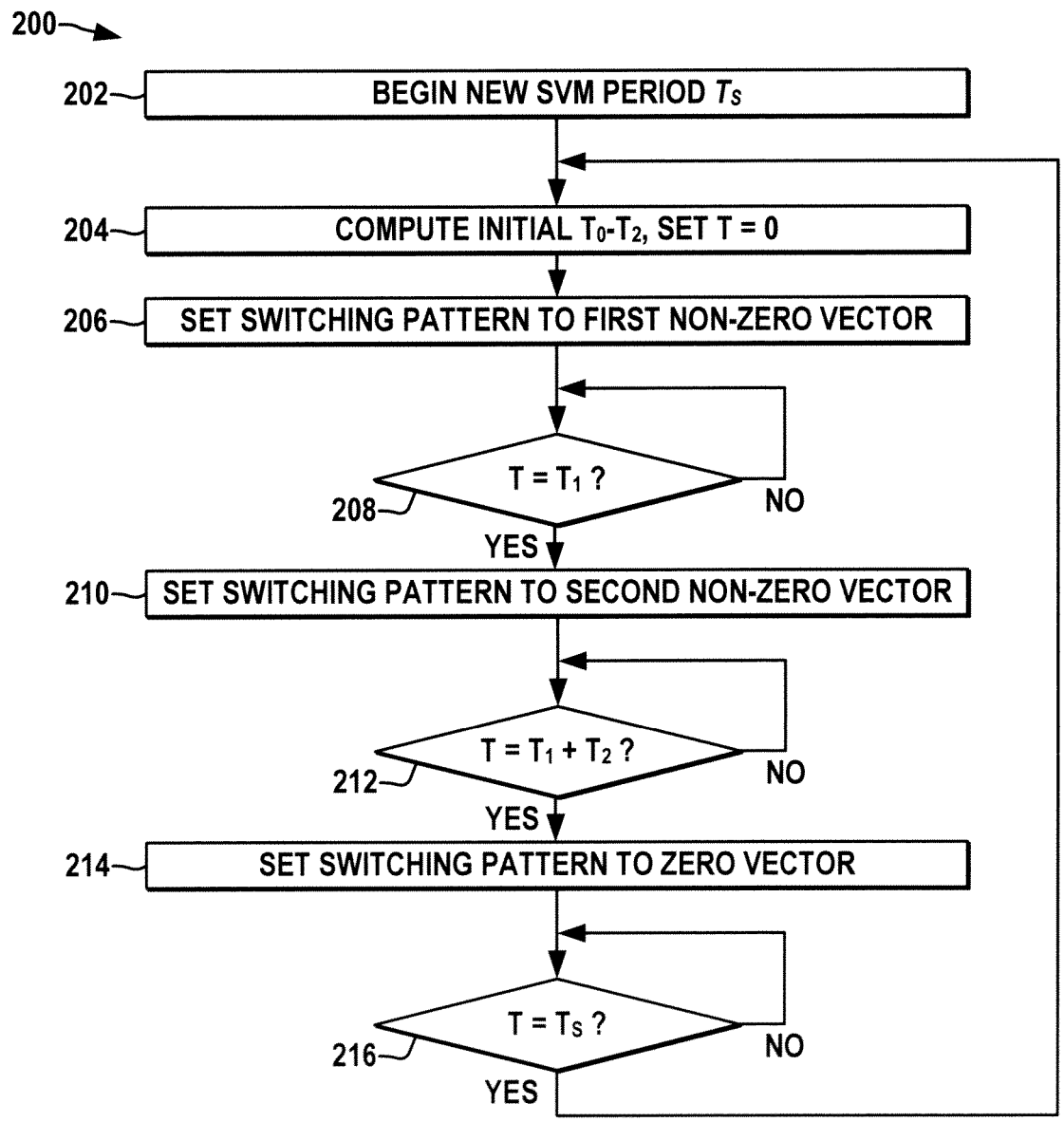
FIGS. 1B and 1C are flow diagrams illustrating an exemplary multi-sampling SVM method in accordance with further aspects of the disclosure.
Figure 1C:
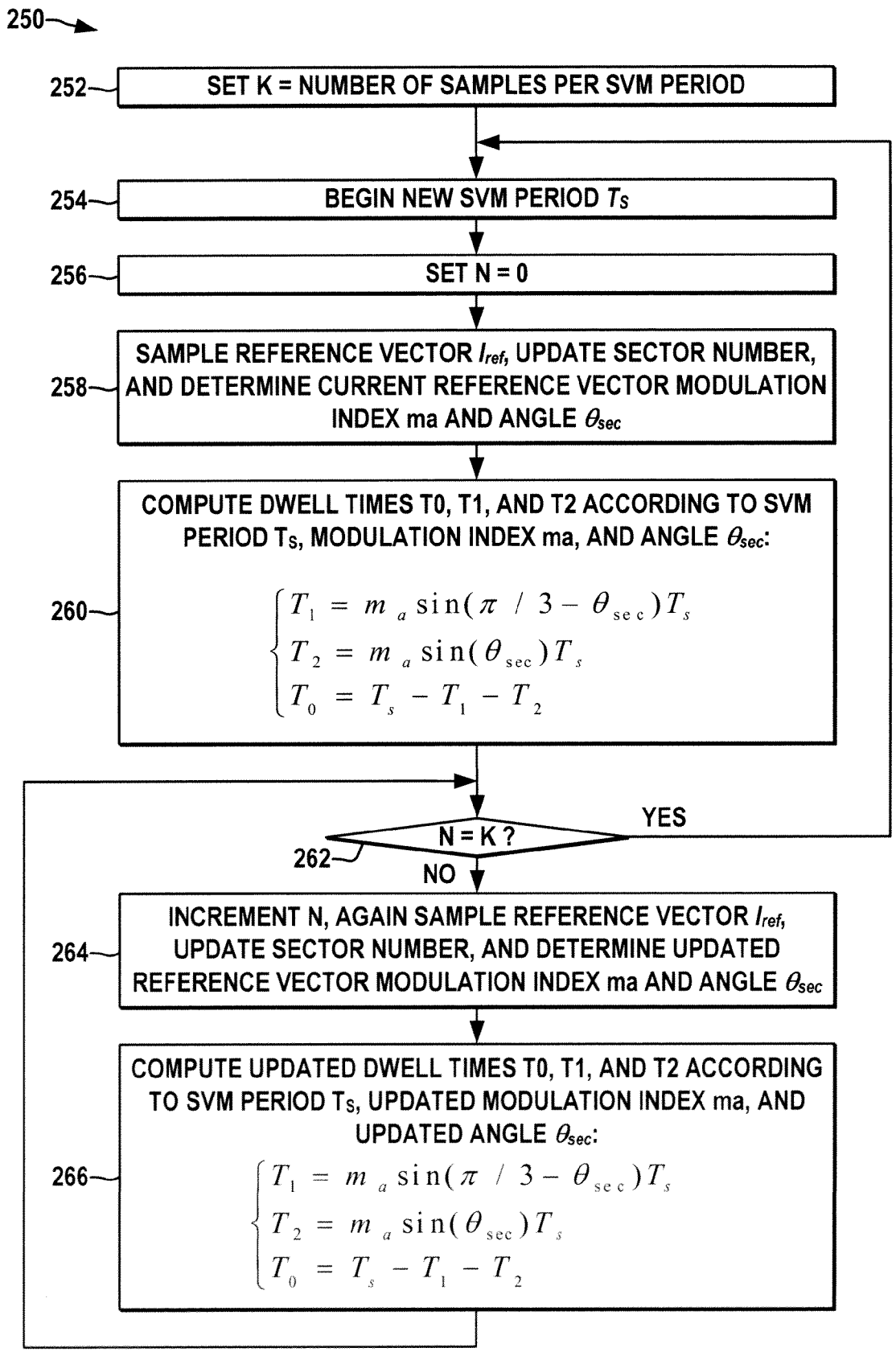

Referring now to FIGS. 1A-1C, the present disclosure provides a solution in which multi-sampling SVM is implemented in the system 110 of FIG. 1. FIGS. 1B and 1C illustrate an exemplary MS-SVM method 200, 250 in accordance with the present disclosure, in which FIG. 1B shows exemplary vector selection 200 according to the computed dwell time values in each SVM period, and FIG. 1C shows operation of the exemplary MS-SVM component(s) 146 in the system 110 of FIG. 1A to sample the reference vector $I_{ref}$ and derive the dwell time values $T_0$-$T_2$ more than once in each SVM period $T_S$. While the method 200, 250 is illustrated and described below in the form of a series of acts or events, it will be appreciated that the various methods of the invention are not limited by the illustrated ordering of such acts or events. In this regard, except as specifically provided hereinafter, some acts or events may occur in different order and/or concurrently with other acts or events apart from those illustrated and described herein in accordance with the invention. It is further noted that not all illustrated steps may be required to implement a process or method in accordance with the present invention, and one or more such acts may be combined. The illustrated methods and other methods of the invention may be implemented in hardware, software, or combinations thereof, in order to provide the MS-SVM modulation control functionality described herein, and may be employed in any power conversion system including but not limited to the above illustrated system 110, wherein the disclosure is not limited to the specific applications and embodiments illustrated and described herein.

In FIG. 1B, the current SVM period $T_S$ begins at 202, with the initial values of $T_0$-$T_2$ being computed and an SVM counter value T being set to zero at 204. At 206, the MS-SVM component 146 sets the switching pattern to a first non-zero vector (e.g., $I_1$ in FIG. 2A) and the counter value T is compared with the first dwell time value $T_1$ at 208. Once the counter T reaches $T_1$ (YES at 208), the switching pattern is set to the second non-zero vector ($I_2$ in FIG. 2A) at 210, and the counter is compared with the sum $T_1+T_2$ at 212. If the counter T reaches $T_S$ before reaching $T_1+T_2$, the process 200 returns to 204 to begin a new SVM period. Otherwise, once the counter T reaches $T_1+T_2$ (YES at 212), the switching pattern is set to the zero vector $I_{20}$ at 214. Then, when the end of the SVM period is reached (T=$T_S$ at 216), the process 200 returns to 204 to begin a new SVM period as described above.

Figure 5:
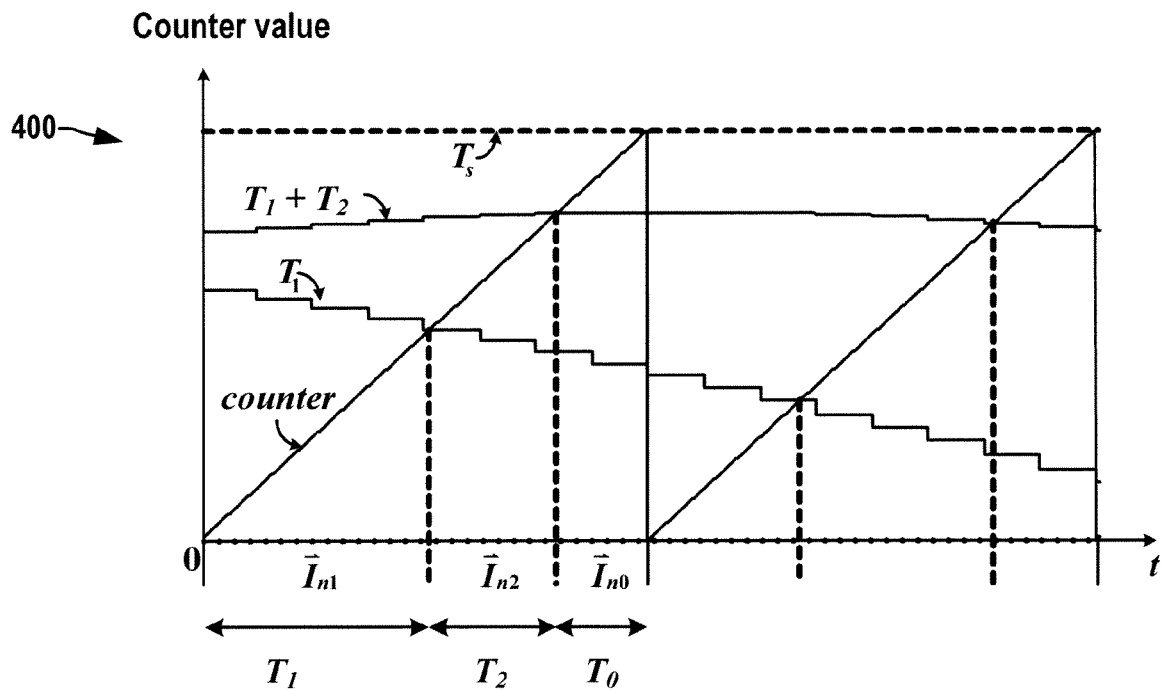
FIG. 5 is a graph showing an exemplary MS-SVM vector selection using dwell time values updated eight times per SVM period in accordance with one or more aspects of the present disclosure.

The flow diagram 250 in FIG. 1C shows operation of the exemplary MS-SVM component(s) 146 in the system 110 of FIG. 1A to sample the reference vector $I_{ref}$ and derive the dwell time values $T_0$-$T_2$ more than once in each SVM period $T_S$. At 252 an integer K is set to the number of samples per SVM period, where K is an integer greater than 1. In the example of FIG. 5 below, K is set to 8, where the component 146 samples the reference vector $I_{ref}$ and derives/updates the corresponding dwell time values $T_0$-$T_2$ eight times in each SVM period $T_S$. In certain embodiments, the MS-SVM sampling may be periodic (e.g., the sample period is $T_S$/K), although this is not a strict requirement of the disclosure. In this regard, the component(s) 146 may sample the reference vector $I_{ref}$ in an aperiodic fashion, and the sampling times may vary within a given SVM period $T_S$ and/or may vary for different SVM periods $T_S$, wherein all such variant implementations are contemplated as falling within the scope of the present disclosure.

A current SVM period $T_S$ begins at 254 and a counter N is set to zero at 256. At 258, the reference vector $I_{ref}$ is sampled by any suitable technique, such as according to a desired motor speed and torque in a control strategy implemented in the inverter controller 144b if FIG. 1A. From this, the MS-SVM component 146 determines the current reference vector modulation index $m_a$, the sector number and the corresponding angle displacement within that sector $\theta_{sec}$ at 258. The dwell times $T_0$-$T_2$ are then computed at 260 using the above equations (2) according to the SVM period $T_S$, the modulation index $m_a$ and the angle $\theta_{sec}$. A determination is made at 262 as to whether the counter N=K. If so (YES at 262), the process 250 returns to begin the next SVM period at 254 as described above. Otherwise (NO at 262), the counter N is incremented, the reference vector $I_{ref}$ is again sampled, and updated reference vector sector number, modulation index $m_a$ and angle $\theta_{sec}$ are determined at 264. At 266, updated dwell times $T_0$-$T_2$ are computed using equations (2) above according to the SVM period $T_S$, the modulation index $m_a$ and the angle $\theta_{sec}$ of the newly sampled reference vector $I_{ref}$. The process 250 then returns to 262 where a determination is made as to whether K samples have been taken in the current SVM period $T_S$. If not (NO at 262), the process continues to again sample the reference vector $I_{ref}$ and update the dwell time values $T_0$-$T_2$ at 264 and 266 as previously described until K updates have occurred (N=K, YES at 262), whereupon the counter N is reset and a new SVM period $T_S$ begins at 254.

In operation, the MS-SVM technique has been found to provide significant reduction of the low order harmonics in motor drives such as the converter 110 shown in FIG. 1A. In many such systems, the output filter capacitors $C_{FO}$ in FIG. 1A are provided, which in combination with the line or machine side inductances of the system may be subject to undesirable LC resonance conditions for high levels of the low order harmonics, such as the $5^{th}$ and $7^{th}$ harmonics, wherein the low order harmonic reduction provided by the described MS-SVM techniques facilitates the application of space vector modulation (and the possibility of modulation index control) to medium voltage drives and other high power conversion system previously thought to be unworkable. In this regard, the filter capacitances $C_{FO}$ in practice are generally able to effectively filter the higher order harmonics, such that the system 110 as a whole is capable of dealing with any incidental increase in such higher order harmonics associated with the application of MS-SVM switching control in the converter 110.

Figure 6:
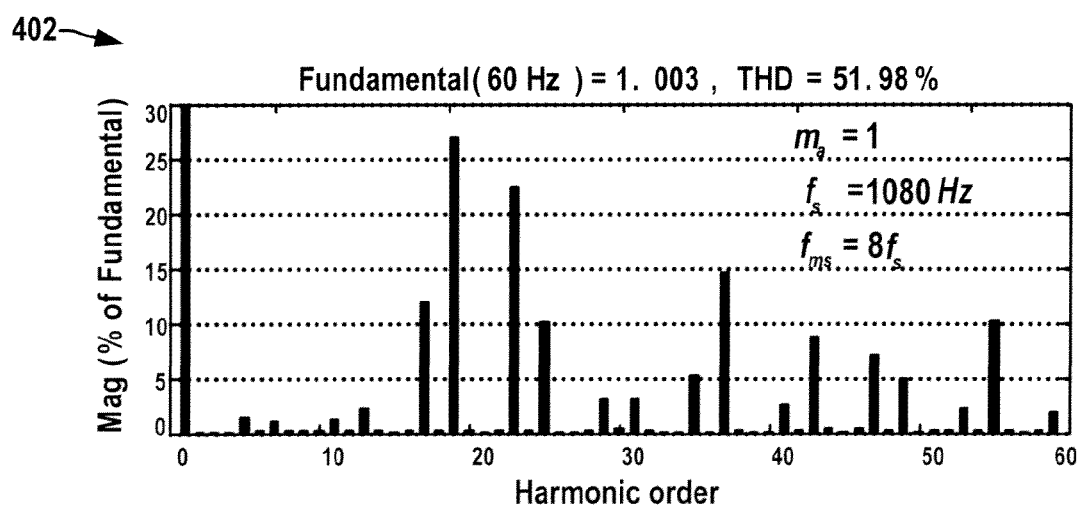
FIG. 6 is an exemplary harmonic profile showing significant reduction in the $5^{th}$ and $7^{th}$ order harmonics in the MS-SVM implementation of FIG. 5.

Referring also to FIGS. 5 and 6, FIG. 5 further illustrates a graph 400 showing the MS-SVM operation of the system 110 with respect to the MS-SVM component 146 in the inverter control 144b, in which the dwell time values are derived using the above equations (2) according to the multiple sampling of the reference vector $I_{ref}$. In this regard, the multiple sampling is done at a sampling ratio SR=$T_S$/$T_{ms}$ where $T_{MS}$ is the time period between reference vector samples. As noted above, however, the reference vector sampling need not be periodic. As shown in FIG. 5, the values of $T_1$ and $T_1$+$T_2$ computed in the MS-SVM component 146 change gradually during a given SVM period $T_S$, reflecting the new updated vector reference angle $\theta_{ref}$, which is smoothly changing during one SVM period. As a result, the intersection points of the counter with these dwell values move accordingly. FIG. 6 provides a graph 402 showing the resulting simulated harmonics obtained from the MS-SVM inverter control for SR=8. Comparison of FIG. 6 with the conventional SVM results in the graph 304 of FIG. 4 shows that the low order harmonics, particularly the $5^{th}$ and $7^{th}$ are significantly reduced by the employment of the MS-SVM in accordance with the present disclosure.

Referring also to FIGS. 2C, 2D, and 7-9, the improved low order harmonic reduction of the multi-sampling approach, moreover, is achieved with only a relatively small amount of additional device switchings in the inverter 110b. The switching pattern and switching frequency for the MS-SVM approach may vary, depending on the values of the modulation index and firing angle. As indicated in equation (2) above, the dwell time calculation depends on both modulation index and firing angle, where the modulation index value affects the total dwell time of all the active vectors and thus the magnitude of the output current. In practical application, the firing angle $\theta_{ref}$ is the sum of the angle of a synchronous frame $\theta_{syn}$ and the control angle $\theta_w$. The synchronous frame could be oriented with respect to a line voltage or motor rotor flux/rotor position, and the synchronous frame rotates at a certain speed. The control angle $\theta_w$ is the angle displacement between the reference angle $\theta_{ref}$ and the angle $\theta_{syn}$ of the synchronous reference frame. The counter is normally synchronized with $\theta_{syn}$, in which case the control angle $\theta_w$ determines the angle displacement $\theta_{sec}$ of the reference vector $I_{ref}$ in a sector which will change the dwell time distribution among active vectors. As a result, adjustment of either modulation index $m_a$ or the control angle $\theta_w$ results in different switching patterns and various output waveforms.

Figure 2C:
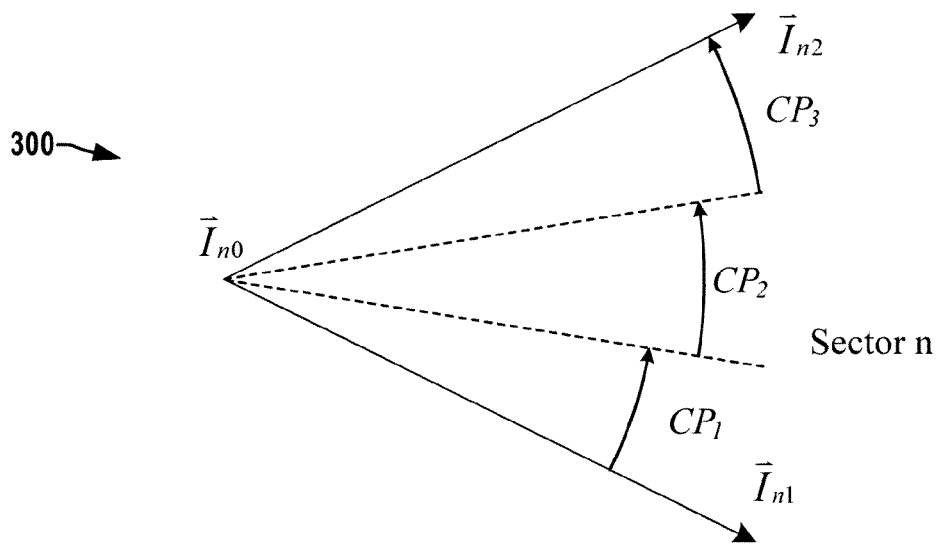
FIG. 2C is a simplified schematic diagram vector angle displacement within an SVM period in a synchronous example with no sector transitions.
Figure 2D:
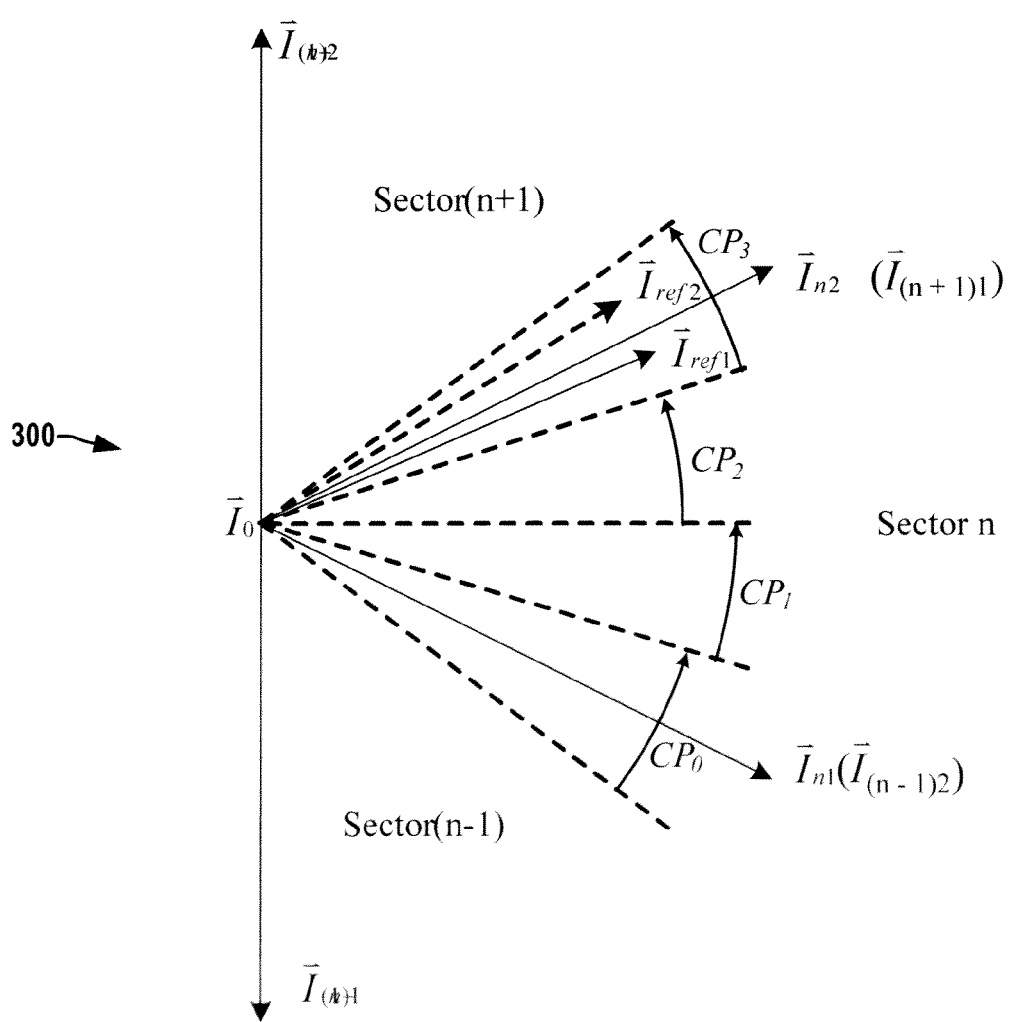
FIG. 2D is a simplified schematic diagram illustrating an asynchronous case having sector transitions within an SVM period.
Figure 7:
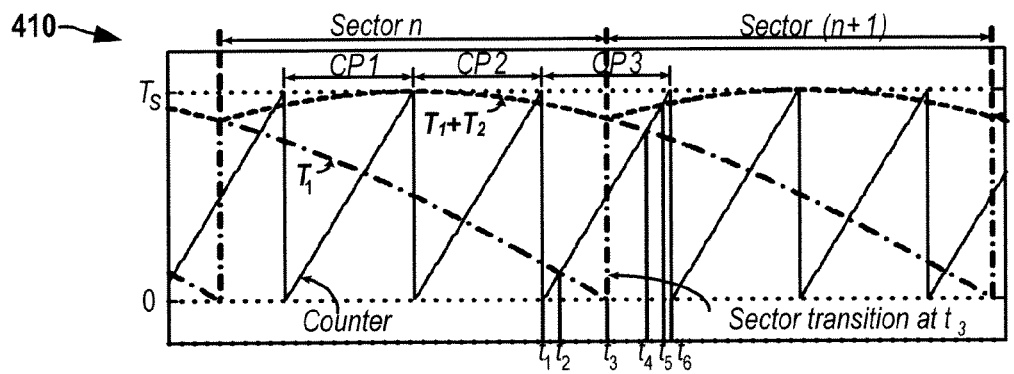
FIG. 7 is a graph showing exemplary MS-SVM vector selection using dwell time values updated multiple times per SVM period with an additional switching caused by sector transition.
Figure 8:
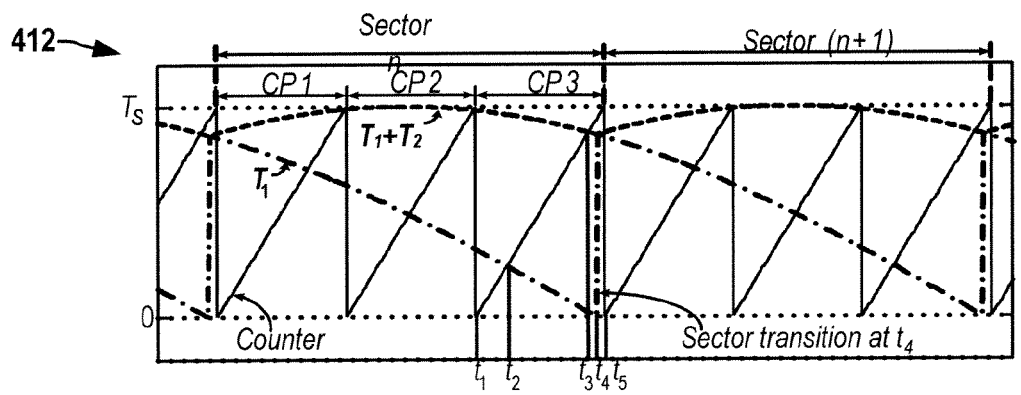
FIG. 8 is a graph showing exemplary MS-SVM vector selection using dwell time values updated multiple times per SVM period with two additional switchings caused by a sector transition.
Figure 9:
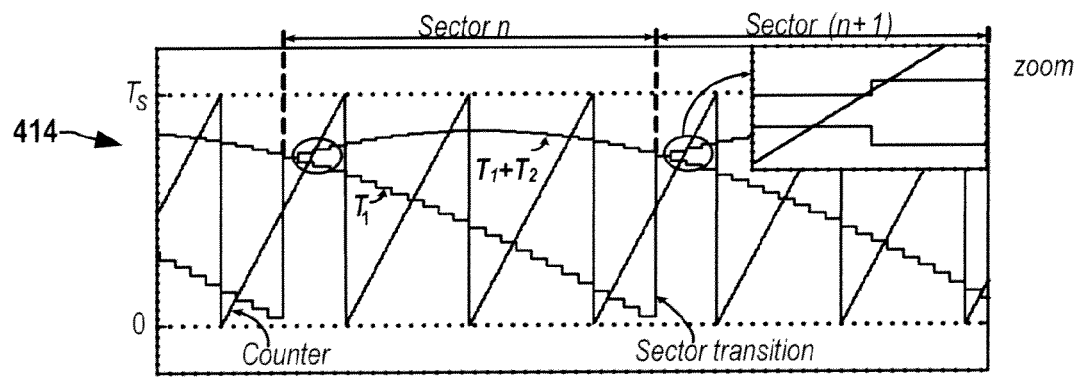
FIG. 9 is a graph showing exemplary MS-SVM vector selection using dwell time values updated multiple times per SVM period with three additional switchings caused by discretization and a sector transition.

FIG. 2C illustrates an example of a synchronous case ($\theta_w$=0) in which no additional switching is generated since the sector boundaries are also SVM period boundaries. FIG. 2D describes the asynchronous case where $\theta_w$ varies and the sector transitions happen inside some of the SVM periods (such as CP3 in FIG. 2D). In this regard, the sampled reference vectors within CP3 could be in sector n ($\vec{I}_{ref1}$ in FIG. 2D) or in sector (n+1) ($\vec{I}_{refk}$ in FIG. 2D). This causes additional switchings, but helps to reduce the low order harmonics. There are three different cases that may increase the switching frequency, depending on the values of the modulation index $m_a$ and the angle displacement $\theta_{sec}$ of the reference vector. FIGS. 7-9 illustrate simulated graphs 410, 412, and 414, respectively, to illustrate these cases, in which the fundamental frequency $f_1$=60 Hz and the SVM period $T_S$ is $1/18 f_1$. In general, the sector boundary crossing between sectors of the space vector diagram (e.g., FIG. 2A above) is the primary cause of the additional device switchings, as shown in FIGS. 7-9. At these sector transitions, a new set of vectors that define the new sector are employed in the MS-SVM component 146, thus adding to the number of vector transitions in the current SVM period $T_S$.

The graph 410 in FIG. 7 and the vector diagram of FIG. 2D illustrate a first case in which one additional device switching is caused by the sector transition, where the dwell times in FIGS. 7 and 8 are simulated using a large SR to better illustrate the sector transition effect. As seen within each sector in FIG. 7, the counter counts up repeatedly from 0 to $T_S$ approximately three times, whereas the simulated dwell time curves ($T_1$ and $T_1+T_2$) are repeated every sector. It is noted in this regard that the time $T_1$ in a given sector is decreasing monotonically, and there is typically only one point of intersection with the counter within a comparison time such as CP1 and CP2 shown in the graph 410. Additional crossing points of the dwell time curves with the counter lead to additional vector transitions, and hence increased device switching events. In this case, the only chance of two points of crossing is in a SVM period in which a sector transition occurs, such as during CP3 in FIG. 7. The other dwell time switching point transition curve $T_1+T_2$ is not monotonic within one sector, but its slope is much slower than that of the counter. Consequently, the possible number of crossing points with the counter is limited to one, as shown in FIG. 7. In this example, starting from time $t_1$, the reference vector is located in sector n and the first vector $\vec{T}_{n1}$ is selected until the counter approaches the time $t_2$ when $t_2-t_1=T_1(t_2)$, at which the MS-SVM component 146 switches to the second vector $I_{n2}$. Before the counter value reaches $T_1+T_2$, the sector transition from sector n to sector (n+1) occurs at time $t_3$ in the example of FIG. 7 (see also FIG. 2D). At this point, another set of vectors for sector (n+1) is selected by the MS-SVM component 146, and the dwell time values $T_0-T_2$ are re-calculated, causing a step-up from 0 to $m_a \sin(\pi/6)T_s$. Moreover, the counter value is lower than $T_1$ at this point, and the vector $I_{(n+1)1}$ is selected. For two adjacent sectors, we have $I_{(n+1)1}=I_{n2}$ and therefore this transition involves no additional switching in the illustrated embodiment. Similarly, the vector switches to $I_{(n+1)2}$ at time $t_4$ and zero vector $I_{(n+1)0}$ at time $t_5$. In summary, this comparison time CP 3 includes 4 transitions of different vectors: $\rightarrow \vec{T}_{n1} \rightarrow \vec{T}_{n2}(\vec{T}_{(n+1)1}) \rightarrow \vec{T}_{(n+1)2} \rightarrow \vec{T}_{(n+1)0}$. Compared with a conventional SVM sequence $\rightarrow \vec{T}_{n1} \rightarrow \vec{T}_{n2} \rightarrow \vec{T}_{n0}$, one additional vector transition occurs in the exemplary MS-SVM approach, and as a result, the device switching frequency is increased from $f_s/2$ to $f_s/2+f_1$, where $f_s/2=1/T_s$ and $f_1$ is the fundamental frequency.

FIG. 8 illustrates a graph 412 showing a second case in which two additional switchings are caused by a sector transition. The difference between this example and that of FIG. 7 is the control angle $\theta_w$ and hence the angle displacement $\theta_{sec}$ of the reference vector in each SVM period. In the case shown in FIG. 8, two more switchings are added to the device due to the sector transition at $t_4$. Prior to the time $t_4$, the switching operates similarly to that of conventional SVM modulation, with vector transitions from $I_{n1}$ to $I_{n2}$ and then to the zero vector $I_{n0}$ at the time $t_3$. Although there is no counter crossing point after $t_3$, the sector transition at time $t_4$ forces the MS-SVM component 146 to select $I_{(n+1)0}$ as a new zero vector. This transition from one zero vector to another involves two devices switching on and two devices switching off. As a result, there are two additional switchings for each device per fundamental-frequency cycle and the device switching frequency is now $f_s/2+2f_1$.

FIG. 9 illustrates a graph 414 showing a third case in which additional device switching events are caused by the discretization associated with the sampling ratio SR. In this regard, the higher the number of reference vector samplings per SVM period $T_S$, the more continuous the curve of the computed dwell time values $T_0-T_2$. As previously noted, the dwell time value curves of FIGS. 7 and 8 were simulated as continuous curves, similar to very high sampling ratios SR. The graph 414 in FIG. 9 shows discretization of the computed dwell time values at a lower SR=8 such that the dwell time curves have a 'stair-case' form due to the discrete times at which the reference vector is sampled and the dwell time values $T_0-T_2$ are updated. This discretization, however, may cause additional switchings as shown in FIG. 9. With SR=8, the dwelling time values $T_0-T_2$ are calculated 8 times during each SVM period $T_S$ and the discretized value of $T_1+T_2$ results in multiple intersections with the counter, as circled and shown in the zoomed portion of FIG. 9. As a result, two more transitions occur after the zero vector from $I_{(n+1)0}$ to $I_{(n+1)2}$, and then back to $I_{(n+1)0}$. It is noted that this third case only occurs when the curve of $T_1+T_2$ is increasing with a slope comparable to that of the counter. The duration of the two additional switchings is normally fugacious, and raises the switching frequency from $f_s/2$ in SVM to $f_s/2+3f_1$ in MS-SVM.

In order to combat these extra device switchings, a further aspect of the disclosure provides for adjusting the MS-SVM to effectively remain at the selected zero vector once the zero vector has been selected in a given SVM period $T_S$. In the illustrated system 110 of FIG. 1, the MS-SVM component 146 of the switch control system 140 provides the inverter switching control signals 142b according to a vector switching sequence with a zero vector $I_0$ last in each space vector modulation period $T_s$, and once the zero vector $I_0$ has been selected, the switch control system 140 maintains the switching control signals 142 according to the zero vector until the end of the space vector modulation period $T_s$. In this manner, the modified MS-SVM can further reduce the device switching frequency while maintaining the desired harmonic profile with reduced $5^{th}$ and $7^{th}$ order harmonics. In operation, the MS-SVM component 146 during a given SVM period $T_S$, once the zero vector is selected, the component 146 will keep using this zero vector till the end of this period $T_S$, by which the device switching frequency the MS-SVM method is improved to be the same as SVM ($f_s/2$) or increase by one fundamental frequency ($f_s/2+f_1$), depending on the specific values of modulation index $m_a$ and the angle of the reference vector.

Compared with conventional SVM implementations, the MS-SVM technique requires only a slightly higher device switching frequency, while allowing modulation index control without the adverse effects of low order harmonic distortion. Three cases are listed in Table I below, in which the device switching frequency of the second SVM method is selected to be 720 Hz instead of 600 Hz to avoid triple order harmonics.

TABLE I

| Methods | SVM Period (s) | Sampling Ratio | Device Switching Frequency (Hz) |
|---|---|---|---|
| MS-SVM | 1/1080 | 8 | 540 or 600 |
| SVM-540 | 1/1080 | 1 | 540 |
| SVM-720 | 1/1440 | 1 | 720 |

The $5^{th}$ and $7^{th}$ order harmonics of the MS-SVM are low in the full range of modulation index and reference vector angle compared with conventional SVM techniques. Specially, the harmonics in the high modulation area are significantly suppressed by using the MS-SVM method. In these simulations, the $5^{th}$ and $7^{th}$ order harmonics of the MS-SVM were found to be below 0.022 in the full range of modulation index $m_a$, and at unity modulation index, the magnitudes of the $5^{th}$ order harmonics of the SVM_540 and SVM_720 are about 8.5% and 7.5% of the maximum fundamental-frequency current, respectively. By using the disclosed MS-SVM methods, the magnitude of the $5^{th}$ order harmonic is reduced to 1.2%. In those comparisons, the modulation index was varied for a firing angle fixed at zero. In further simulations, the magnitudes of the harmonics were also found to be different at various angles of $\theta_w$. As shown in FIGS. 7-9, moreover, the relative reference vector angle in each SVM period determines the switching pattern, and the harmonics profile will repeat every 20 degrees. With the modulation index $m_a$ set to unity, as $\theta_w$ is varied from 0 to 20 degrees, the magnitude of $5^{th}$ order harmonic of the SVM_540 is in the range of 8% to 11% of $I_{w1, max}$ while that of the MS-SVM is below 1.2%, with both the $5^{th}$ and $7^{th}$ order harmonics being substantially reduced at various angles, where $I_{w1, max}$ is the maximum fundamental frequency current when the modulation index ma is equal to 1.0.

When the conventional SVM and disclosed MS-SVM switching schemes are applied to CSI based drive systems, the low order harmonics are the main concern since the high order harmonics can be substantially damped by the filter capacitors $C_{FO}$ (FIG. 1A above) and the machine inductances. As a result, the MS-SVM also exhibits much lower current waveform compared with conventional SVM. A steady-state induction machine (e.g., 1250 hp, 4160V) operation was simulated with a constant DC link current and a current source converter 110. The simulated THD and major harmonics components are listed in Table II below. In this case, the low order harmonics of machine current are substantially reduced by using the MS-SVM techniques of the present disclosure compared with conventional SVM switching approaches. As a result, the machine torque ripple caused by the current ripple will be reduced.

TABLE II

|  | Current THD | 5th | 7th | 11th | 13th | 17th | 19th | 23rd | 25th |
|---|---|---|---|---|---|---|---|---|---|
| MS-SVM | 1.40% | 0.58% | 0.26% | 0.13% | 0.17% | 0.52% | 0.94% | 0.54% | 0.20% |
| SVM | 4.23% | 3.98% | 1.01% | 0.14% | 0.29% | 0.36% | 0.70% | 0.44% | 0.26% |

In accordance with further aspects of the present disclosure, a computer readable medium is provided, such as a computer memory, a memory within a power converter control system (e.g., switch control system 140 in FIG. 1A above), a CD-ROM, floppy disk, flash drive, database, server, computer, etc.) which has computer executable instructions for performing the steps of providing switching control signals 142 by space vector modulation to a plurality of switching devices of a switching network (e.g., S1-S6 and/or S7-S12 in the converter 110 of FIG. 1A) according to a plurality of dwell time values $T_0-T_2$ in each of a continuous series of space vector modulation periods $T_s$ to convert power from DC to AC or AC to DC using the switching network 110, sampling a current reference vector $I_{ref}$ a plurality of times during each modulation period $T_s$, and for each sampling of the current reference vector $I_{ref}$, deriving the dwell time values $T_0-T_2$ according to a modulation index $m_a$ and an angle $\theta_{sec}$ associated with the current reference vector $I_{ref}$ representing a desired converted AC in a current space vector diagram sector to selectively provide three switching states in the switching network 110 corresponding to three diagram vectors $I_0-I_6$ defining the current diagram sector. In various embodiments, further computer executable instructions are included in the medium for providing the switching control signals 142 by space vector modulation comprises according to a vector switching sequence with a zero vector $I_0$ last in each space vector modulation period $T_s$, with switching between vectors at the dwell times $T_0-T_2$, and for maintaining the switching control signals 142 according to the zero vector once the zero vector $I_0$ has been selected until the end of the space vector modulation period $T_s$. Moreover, embodiments are contemplated in which the medium includes further computer executable instructions for deriving the dwell time values $T_0-T_2$ a plurality of times during each modulation period $T_s$ according to the equations (2) above.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
   at least one multi-phase AC connection having two or more AC terminals for receiving or supplying multi-phase electrical power;
   a DC circuit for receiving or supplying DC electrical power, the DC circuit comprising first and second DC current paths and at least one storage component;
   a switching network comprising a plurality of switching devices individually coupled between one of the DC current paths and one of the AC terminals, the switching devices individually operable to selectively electrically couple the corresponding DC current path with the corresponding AC terminal according to a corresponding switching control signal; and
   a switch control system providing the switching control signals by space vector modulation according to a plurality of dwell time values derived from a modulation index and an angle associated with a current reference vector representing a desired converted AC in a current space vector diagram sector to selectively provide three switching states in the switching network corresponding to three diagram vectors defining the current diagram sector in each of a continuous series of space vector modulation periods to convert power from DC to AC or AC to DC using the switching network, the switch control system comprising a multi-sampling SVM component operative to sample the current reference vector and derive the dwell time values a plurality of times during each modulation period.

2. The power conversion system of claim 1:

wherein the switching network is an inverter circuit comprising a plurality of switching devices individually coupled between one of the DC current paths and one of the AC terminals forming the AC connection, the switching devices individually operable to selectively electrically couple the corresponding DC current path with the corresponding AC terminal according to a corresponding inverter switching control signal to convert DC power to AC power at an AC output connection;

wherein the switch control system includes an inverter control component operative to provide the inverter switching control signals by space vector modulation according to inverter dwell time values derived from a modulation index and an angle associated with an inverter current reference vector representing a desired converted AC at the AC output connection in each of a continuous series of inverter space vector modulation periods; and wherein the inverter control component includes a multi-sampling SVM component operative to sample the inverter current reference vector and derive the inverter dwell time values a plurality of times during each inverter space vector modulation period.

3. The power conversion system of claim 2, further comprising a second switching network forming a switching rectifier comprising a plurality of switching devices individually coupled between one of the DC current paths and an AC input connection, the switching devices of the second switching network individually operable to selectively electrically couple the corresponding DC current path with the corresponding AC input according to a corresponding rectifier switching control signal to convert input AC power to DC power in the DC circuit, and wherein the switch control system includes a rectifier control component operative to provide the rectifier switching control signals.

4. The power conversion system of claim 3, wherein the rectifier control component provides the rectifier switching control signals by space vector modulation according to rectifier dwell time values derived from a modulation index and an angle associated with a rectifier current reference vector representing a desired converted AC at the AC input connection in each of a continuous series of rectifier space vector modulation periods, and wherein the rectifier control component includes a multi-sampling SVM component operative to sample the rectifier reference vector and derive the rectifier dwell time values a plurality of times during each modulation rectifier space vector modulation period.

5. The power conversion system of claim 1, wherein the switching network is a switching rectifier comprising a plurality of switching devices individually coupled between one of the DC current paths and an AC input connection, the switching devices of the switching network individually operable to selectively electrically couple the corresponding DC current path with the AC input connection according to a corresponding rectifier switching control signal to convert input AC power to DC power in the DC circuit;

wherein the switch control system includes a rectifier control component operative to provide the rectifier switching control signals by space vector modulation according to rectifier dwell time values derived from a modulation index and an angle associated with a rectifier current reference vector representing a desired converted AC at the AC input connection in each of a continuous series of rectifier space vector modulation periods; and wherein the rectifier control component includes a multi-sampling SVM component operative to sample the rectifier current reference vector and derive the rectifier dwell time values a plurality of times during each rectifier space vector modulation period.

6. The power conversion system of claim 1, wherein the conversion system is a current source converter.

7. The power conversion system of claim 1, wherein the conversion system is a voltage source converter.

8. The power conversion system of claim 1, wherein the conversion system is a motor drive operative to drive an AC motor load.

9. The power conversion system of claim 1, wherein the switch control system provides the switching control signals according to a vector switching sequence with a zero vector last in each space vector modulation period, with switching between vectors at the dwell times, and wherein once the zero vector has been selected, the switch control system maintains the switching control signals according to the zero vector until the end of the space vector modulation period.

10. The power conversion system of claim 1, wherein the switch control system provides the switching control signals according to a vector switching sequence with a zero vector, and first and second non-zero vectors with the zero vector being applied for a time $T_0$, the first non-zero vector being applied for a time $T_1$, and the second non-zero vector being applied for a time $T_2$ in each space vector modulation period $T_s$, and wherein the multi-sampling SVM component is operative to sample the current reference vector and derive the dwell time values $T_0$–$T_2$ according to the following equations a plurality of times during each space vector modulation period $T_s$:

$$\begin{cases} T_1 = m_a \sin(\pi/3 - \theta_{sec})T_s \\ T_2 = m_a \sin(\theta_{sec})T_s \\ T_0 = T_s - T_1 - T_2. \end{cases}$$

11. A method for space vector modulation switching control of a switching power converter, the method comprising:

providing switching control signals by space vector modulation to a plurality of switching devices of a switching network according to a plurality of dwell time values in each of a continuous series of space vector modulation periods to convert power from DC to AC or AC to DC using the switching network;

sampling a current reference vector a plurality of times during each modulation period; and for each sampling of the current reference vector, deriving the dwell time values according to a modulation index and an angle associated with the current reference vector representing a desired converted AC in a current space vector diagram sector to selectively provide three switching states in the switching network corresponding to three diagram vectors defining the current diagram sector.

12. The method of claim 11, wherein the switching control signals are provided by space vector modulation according to a vector switching sequence with a zero vector last in each space vector modulation period, with switching between vectors at the dwell times, further comprising maintaining the switching control signals according to the zero vector once the zero vector has been selected until the end of the space vector modulation period.

13. The method of claim 12, wherein the dwell time values $T_0$-$T_2$ are derived a plurality of times during each space vector modulation period $T_s$ according to the following equations:

$$\begin{cases} T_1 = m_a \sin(\pi/3 - \theta_{sec})T_s \\ T_2 = m_a \sin(\theta_{sec})T_s \\ T_0 = T_s - T_1 - T_2. \end{cases}$$

14. A control system for operating a plurality of switching devices to convert electrical power, the control system comprising:
a space vector modulation component that provides a plurality of switching control signals by space vector modulation according to a plurality of dwell time values in each of a continuous series of space vector modulation periods; the space vector modulation component operative to sample a current reference vector a plurality of times during each modulation period, and for each sampling of the current reference vector, to derive the dwell time values according to a modulation index and an angle associated with the current reference vector representing a desired converted AC in a current space vector diagram sector to selectively provide three switching states corresponding to three diagram vectors defining the current diagram sector.

15. The control system of claim 14, wherein the space vector modulation component provides the switching control signals according to a vector switching sequence with a zero vector last in each space vector modulation period, with switching between vectors at the dwell times, and wherein once the zero vector has been selected, the switch control system maintains the switching control signals according to the zero vector until the end of the space vector modulation period.

16. The control system of claim 14, wherein the space vector modulation component provides the switching control signals according to a vector switching sequence with a zero vector, and first and second non-zero vectors, with the zero vector being applied for a time $T_0$, the first non-zero vector being applied for a time $T_1$, and the second non-zero vector being applied for a time $T_2$ in each space vector modulation period $T_s$, and wherein the multi-sampling SVM component is operative to sample the current reference vector and derive the dwell time values $T_0$-$T_2$ according to the following equations a plurality of times during each space vector modulation period $T_s$:

$$\begin{cases} T_1 = m_a \sin(\pi/3 - \theta_{sec})T_s \\ T_2 = m_a \sin(\theta_{sec})T_s \\ T_0 = T_s - T_1 - T_2. \end{cases}$$

17. A computer readable media comprising computer-executable instructions for:
providing switching control signals by space vector modulation to a plurality of switching devices of a switching network according to a plurality of dwell time values in each of a continuous series of space vector modulation periods to convert power from DC to AC or AC to DC using the switching network;
sampling a current reference vector a plurality of times during each modulation period; and
for each sampling of the current reference vector, deriving the dwell time values according to a modulation index and an angle associated with the current reference vector representing a desired converted AC in a current space vector diagram sector to selectively provide three switching states in the switching network corresponding to three diagram vectors defining the current diagram sector.

18. The computer readable media of claim 17, comprising computer-executable instructions for providing the switching control signals by space vector modulation comprises according to a vector switching sequence with a zero vector last in each space vector modulation period, with switching between vectors at the dwell times, and computer-executable instructions for maintaining the switching control signals according to the zero vector once the zero vector has been selected until the end of the space vector modulation period.

19. The computer readable media of claim 18, comprising computer-executable instructions for deriving the dwell time values a plurality of times during each space vector modulation period according to the following equations:

$$\begin{cases} T_1 = m_a \sin(\pi/3 - \theta_{sec})T_s \\ T_2 = m_a \sin(\theta_{sec})T_s \\ T_0 = T_s - T_1 - T_2. \end{cases}$$

* * * * *